United States Patent [19]
Watson

[11] Patent Number: 6,019,239
[45] Date of Patent: Feb. 1, 2000

[54] PORTABLE COMPOST RETENTION UNIT

[76] Inventor: Steven E. Watson, 4841 Garfield Ave. S., Minneapolis, Minn. 55409

[21] Appl. No.: 08/937,330

[22] Filed: Sep. 20, 1997

[51] Int. Cl.⁷ ........................................................ B65D 6/00
[52] U.S. Cl. ............................... 220/6; 220/4.27; 220/493
[58] Field of Search ................................ 220/6, 9.1, 9.2, 220/4.22, 4.26, 493, 4.27

[56] References Cited

U.S. PATENT DOCUMENTS

| | | | |
|---|---|---|---|
| 2,654,498 | 10/1953 | Jennison | 220/6 X |
| 4,211,033 | 7/1980 | Ringer | 220/6 X |
| 4,832,222 | 5/1989 | Storton | 220/6 |
| 4,848,585 | 7/1989 | Snyder | 220/4.27 X |
| 5,072,828 | 12/1991 | Irvine | 220/493 X |
| 5,392,906 | 2/1995 | Taniyama | 220/4.27 X |

OTHER PUBLICATIONS

Author: Crocket, James Underwood Book Title: Crockett's Victory Garden Chapter Title: The Composter, or the Brown Gold Cadillac (pp. 180–183) Publisher: Little, Brown & Co. (1977).

*Primary Examiner*—Steven Pollard
*Attorney, Agent, or Firm*—Moore & Hansen

[57] ABSTRACT

A compost retention unit is provided. The compost retention unit includes mesh retention material secured to a plurality of pivotally interconnected frame structures such that the mesh retention material and the plurality of frame structures can cooperate to retain compost within the unit when the unit is fully assembled upon a generally flat surface. In preferred embodiments, a first frame structure can pivot 180 degrees with respect to a second frame structure when the unit is being assembled. The most preferred retention unit includes three rectangular frame structures, preferably made of four lengths of wooden "two-by-four" or "two-by-six" framing materials, and the mesh retention material is preferably a wire mesh material.

5 Claims, 8 Drawing Sheets

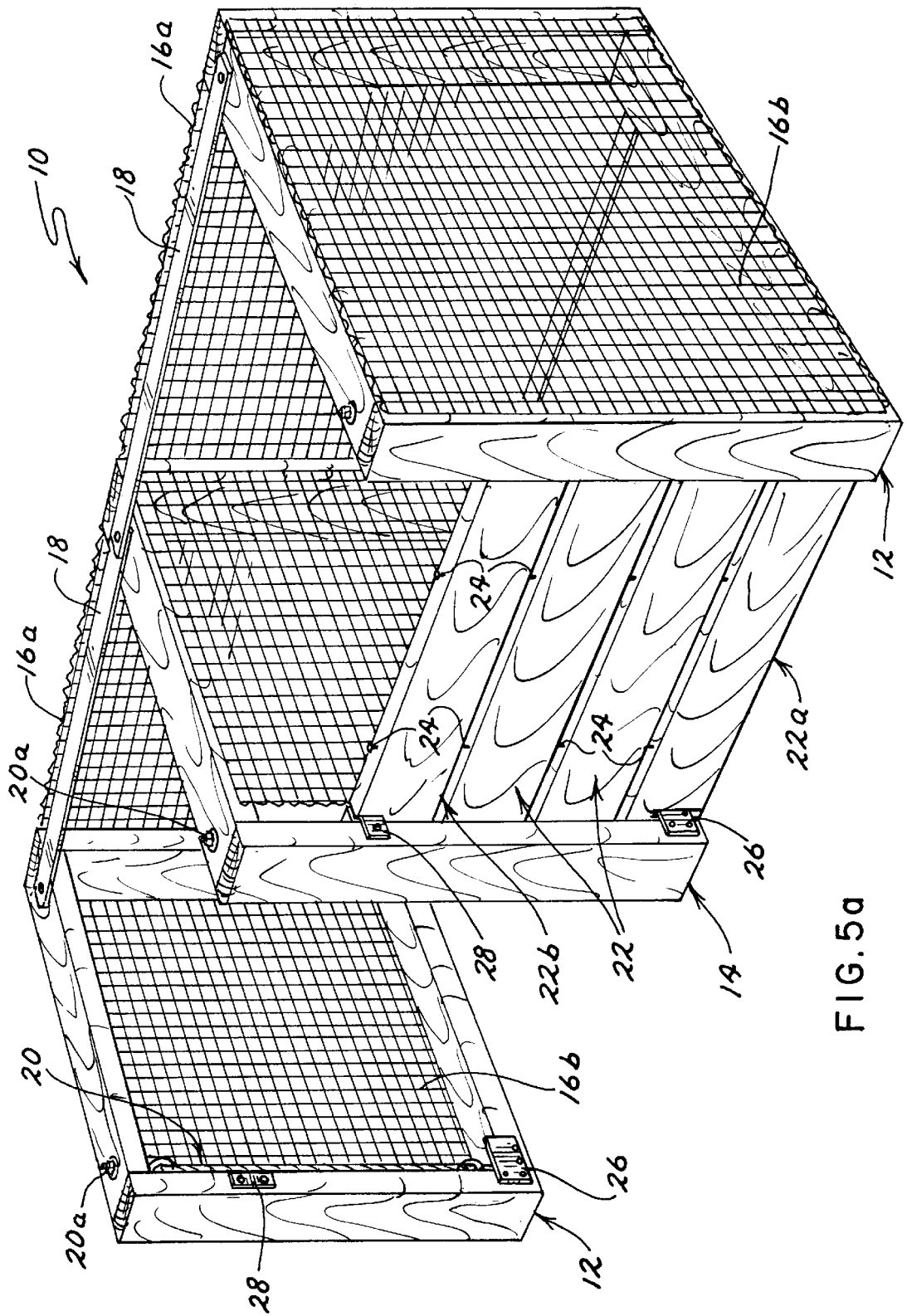

PORTABLE COMPOST RETENTION UNIT

FIELD OF THE INVENTION

The present invention relates to a retention unit for retaining materials such as leaves and other compostable natural materials ("compost") for sufficient time to allow the materials to begin to "compost" or degrade structurally. The present unit relates specifically to portable units which fold together for shipment and storage, and unfold for assembly into a standing retention unit.

The unit described below is designed to control and recycle organic wastes effectively within the urban environment, is intended for use by individual property or homeowners and is commonly referred to as a compost box, compost unit or composter.

BACKGROUND OF THE INVENTION

It will be appreciated that compost units are difficult to conveniently build or assemble from "scratch", and that the expense in having one built by others, or the time involved in building one are significant. Therefore, there is a long felt need for a compost unit which is functional and easy to assemble.

The present invention addresses these and other problems associated with prior art composting technologies and also offers other advantages over the prior art, solving other problems associated therewith.

SUMMARY OF THE INVENTION

In accordance with the present invention a compost retention unit is provided. The compost retention unit comprises mesh retention material secured to a plurality of pivotally interconnected frame structures such that the mesh retention material and the plurality of frame structures can cooperate to retain compost within the unit when the unit is fully assembled upon a generally flat surface. In preferred embodiments, a first frame structure can pivot 180 degrees with respect to a second frame structure when the unit is being assembled.

The present retention unit has many advantages over the prior art compost units. Among these advantages are ease of assembly, ease of shipping and storage prior to assembly, ease of packaging prior to shipping, its relatively light weight, mobility, portability, cost, and the lack of need to anchor the unit. The ease of access to compost retained in the unit and the multiple strategies for processing compost material within a multiple-bin structure are also advantages.

The unit is easily assembled through a simple, three-step process involving separation and rotation of frame structures, fastening of a rear screen, and placement of containment slats. Prior to assembly, the portable compost retention unit occupies a minimal space: collapsed, it is approximately one foot wide, and can be moved and manipulated easily prior to assembly. Minimal space is needed for shipping and storage of the unit, but it extends to six feet in length when assembled, thereby accomodating a much greater volume of organic material (which also maximizes the primary composting process, bacterial decomposition) over prior art composting technologies.

The preferred embodiment also utilizes removable containment slats which allow easy access to the organic material. In turn, a system of internal wires rather than additional frame structure material defines and restricts movement of containment slats, thereby decereasing the overall weight and cost of materials in comparison to prior art composting technologies.

The above-described features and advantages along with various other advantages and features of novelty are pointed out with particularity in the claims of the present invention. However, for a better understanding of the invention, its advantages, and object attained by its use, references should be made to the drawings which form a further part of the present application and to the accompanying descriptive matter in which there is illustrated and described preferred embodiments of the present invention.

BRIEF DESCRIPTION OF THE DRAWINGS

In the drawings, in which like and primed reference numerals and letters indicate corresponding parts of the preferred embodiments of the present invention throughout the several views.

DETAILED DESCRIPTION OF THE PREFERRED EMBODIMENTS

Figure 1A:
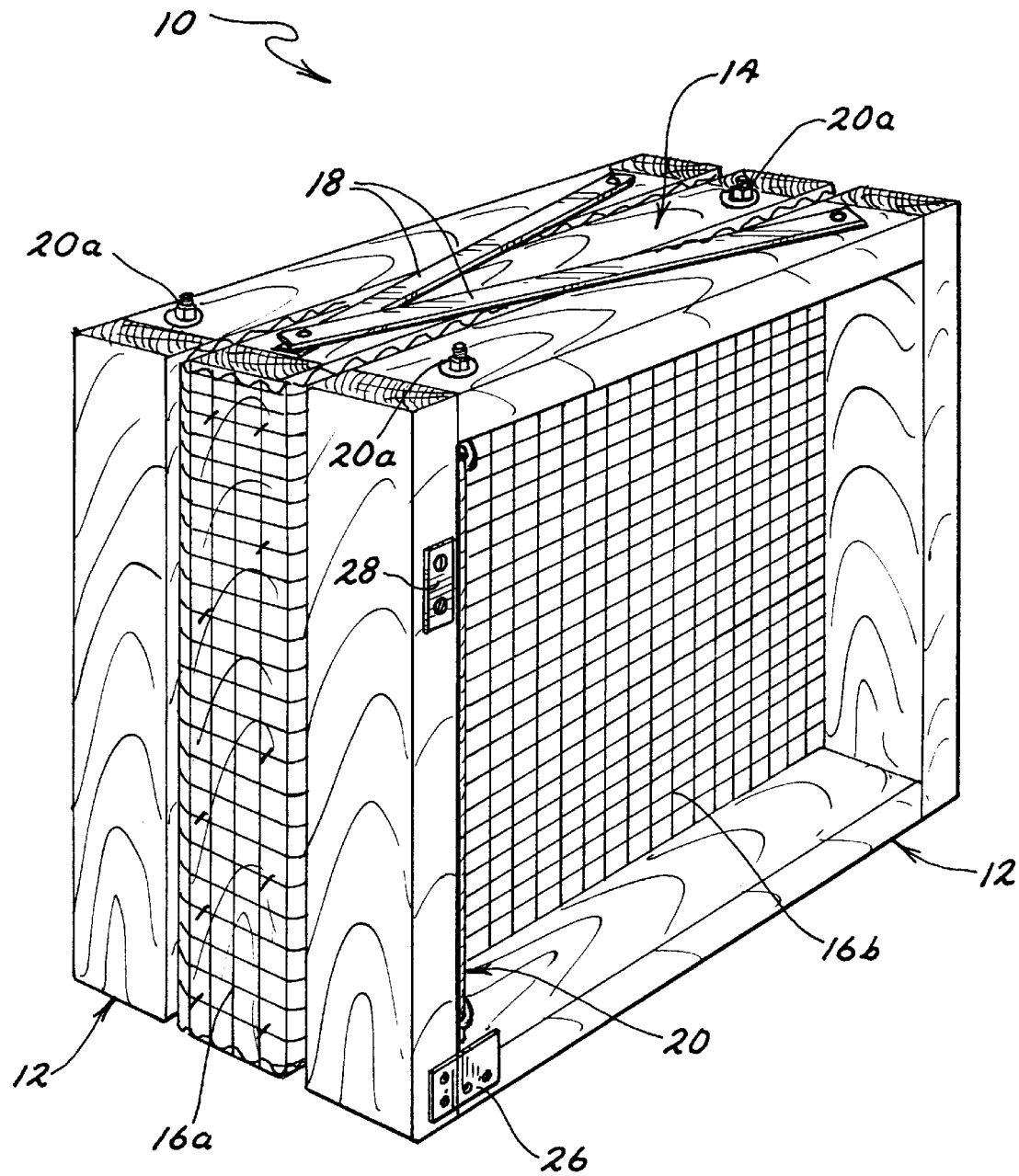
FIGS. 1a and 1b are perspective views generally from the back side of a collapsed portable compost retention unit in accord with the present invention.
Figure 1B:
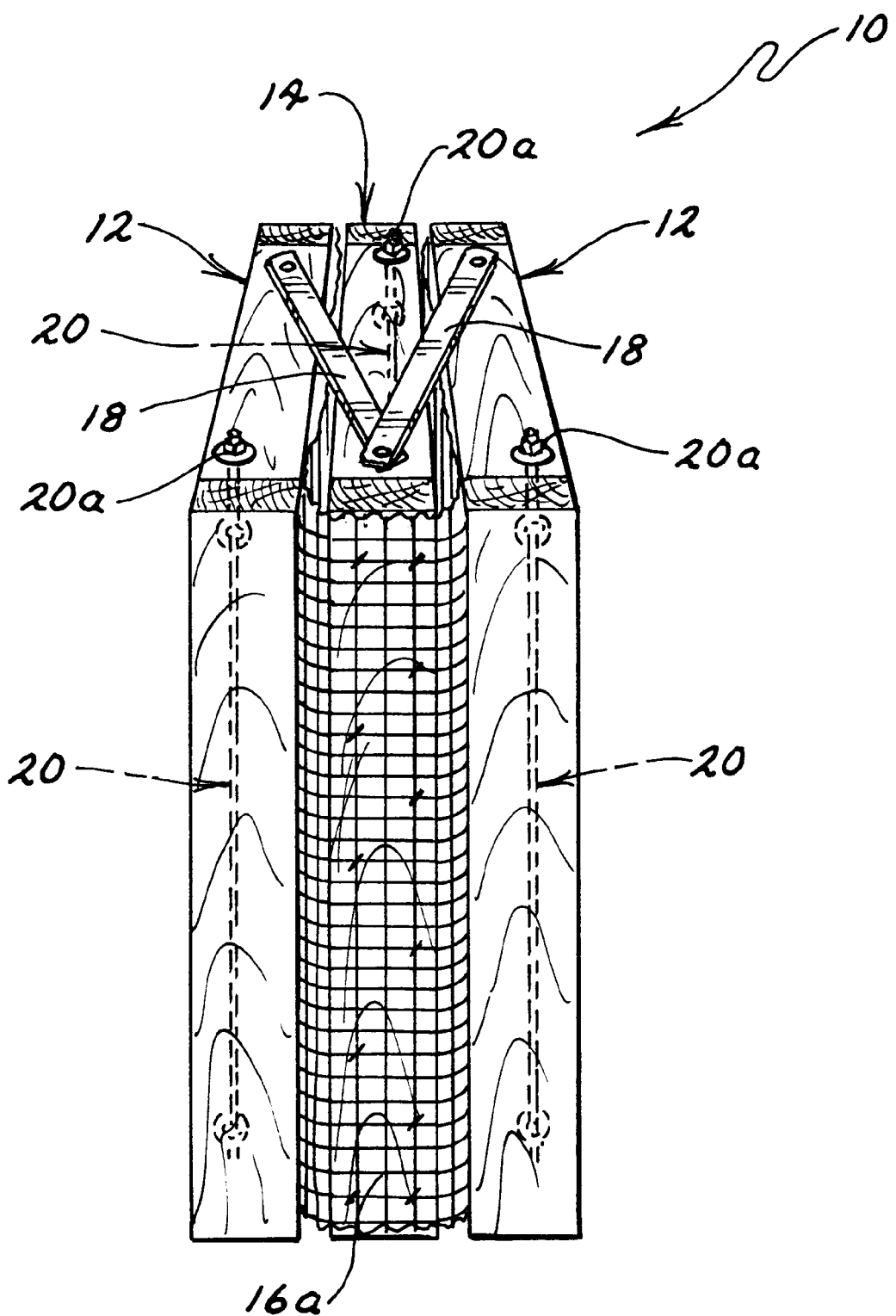
Figure 2:
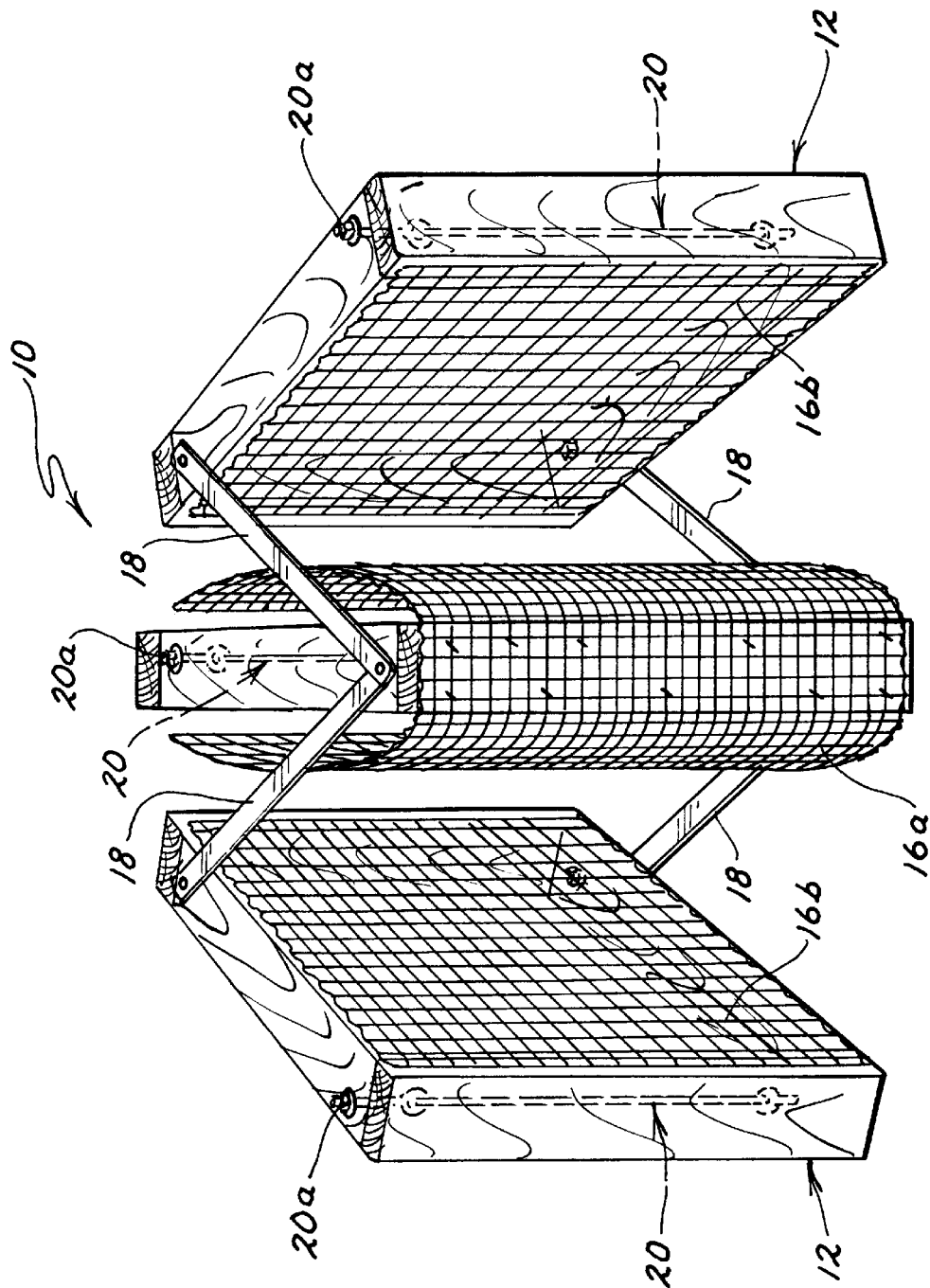
FIG. 2 is a perspective view from the back side depicting the unfolding of the retention unit in FIGS. 1a and 1b.

Referring now to the drawings and specifically to FIGS. 1a, 1b and 2, the partially assembled portable compost retention unit 10 in collapsed form comprises two outer frame structures 12, an interconnected center frame structure 14, and mesh retention material 16a, 16b, 16c. Frame structures 12 and 14 are pivotally attached to cross braces 18 on the top and bottom of the retention unit 10.

Prior to assembly, mesh retention material 16a is enclosed within the retention unit 10 and connected to center frame structure 14. Mesh retention material 16b covers the opening of outer frame structures 12 completely, while mesh retention material 16c is offset, leaving center frame structure 14 partially open to accomodate placement of containment slats 22 on the inside of frame structures 12 and 14. See also FIGS. 5 and 6.

Frame structures 12 and 14 also include an internal wire restraint 20 located on the opposite side from attachment to cross brace 18. An adjustment nut 20a engages wire restraint 20 and protrudes above frame structure 12 and 14 to allow for adjustment of tension on internal wire restraints 20.

Figure 3:
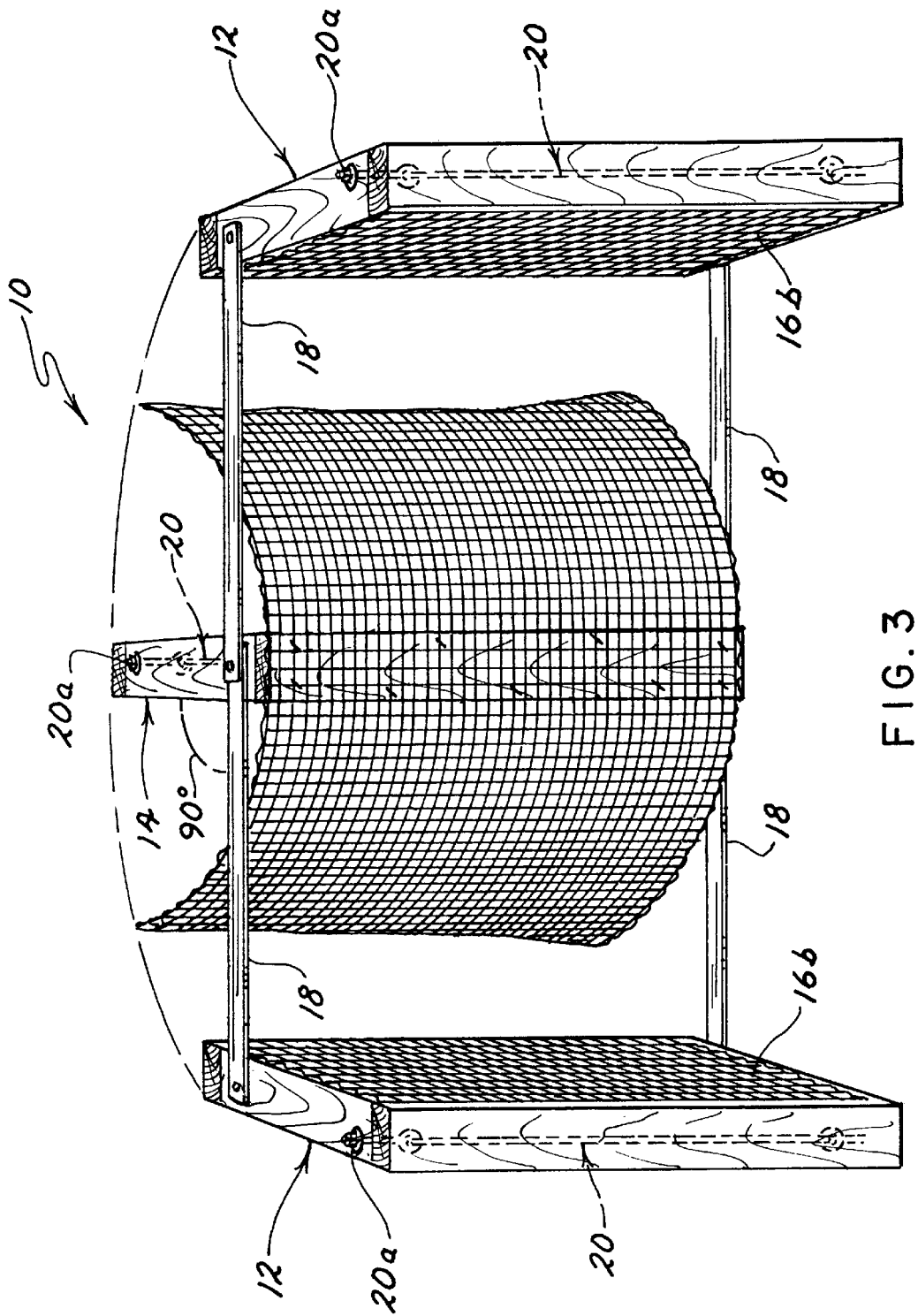
FIG. 3 is a perspective view from the back side of the retention unit in FIGS. 1a, 1b and 2 in full extention.
Figure 4:
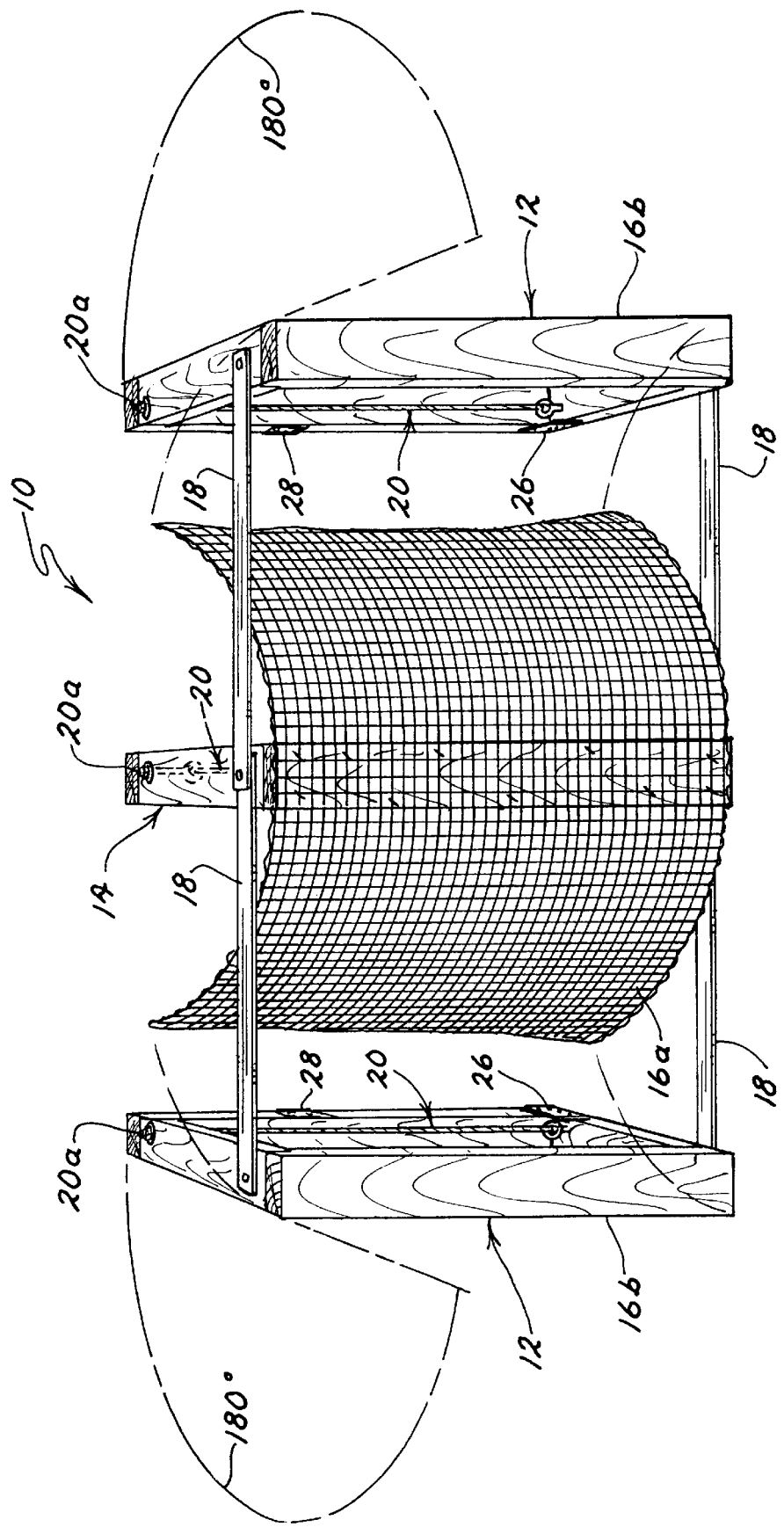
FIG. 4 is a perspective view from the back side of the retention unit in FIGS. 1–3 in position for final assembly.
Figure 5B:
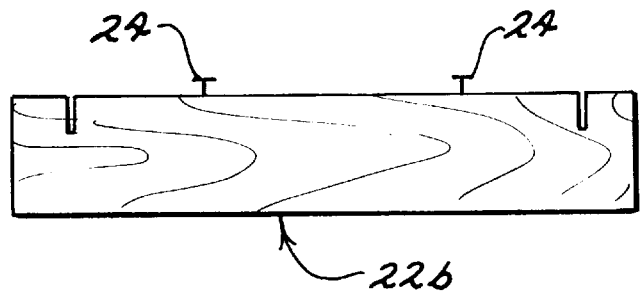
FIG. 5a is a perspective view from the front of the fully-assembled retention unit and FIGS. 5b, 5c and 5d each show a side view of containment slats 22b, 22a and 22, respectively, in accord with the present invention.
Figure 5D:
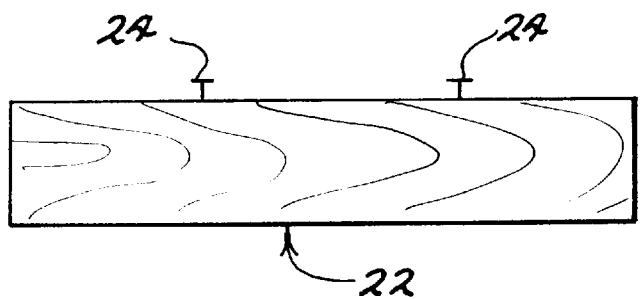
Figure 5C:
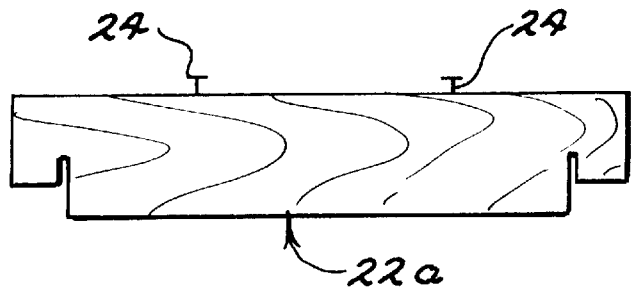
Figures 6, 7:
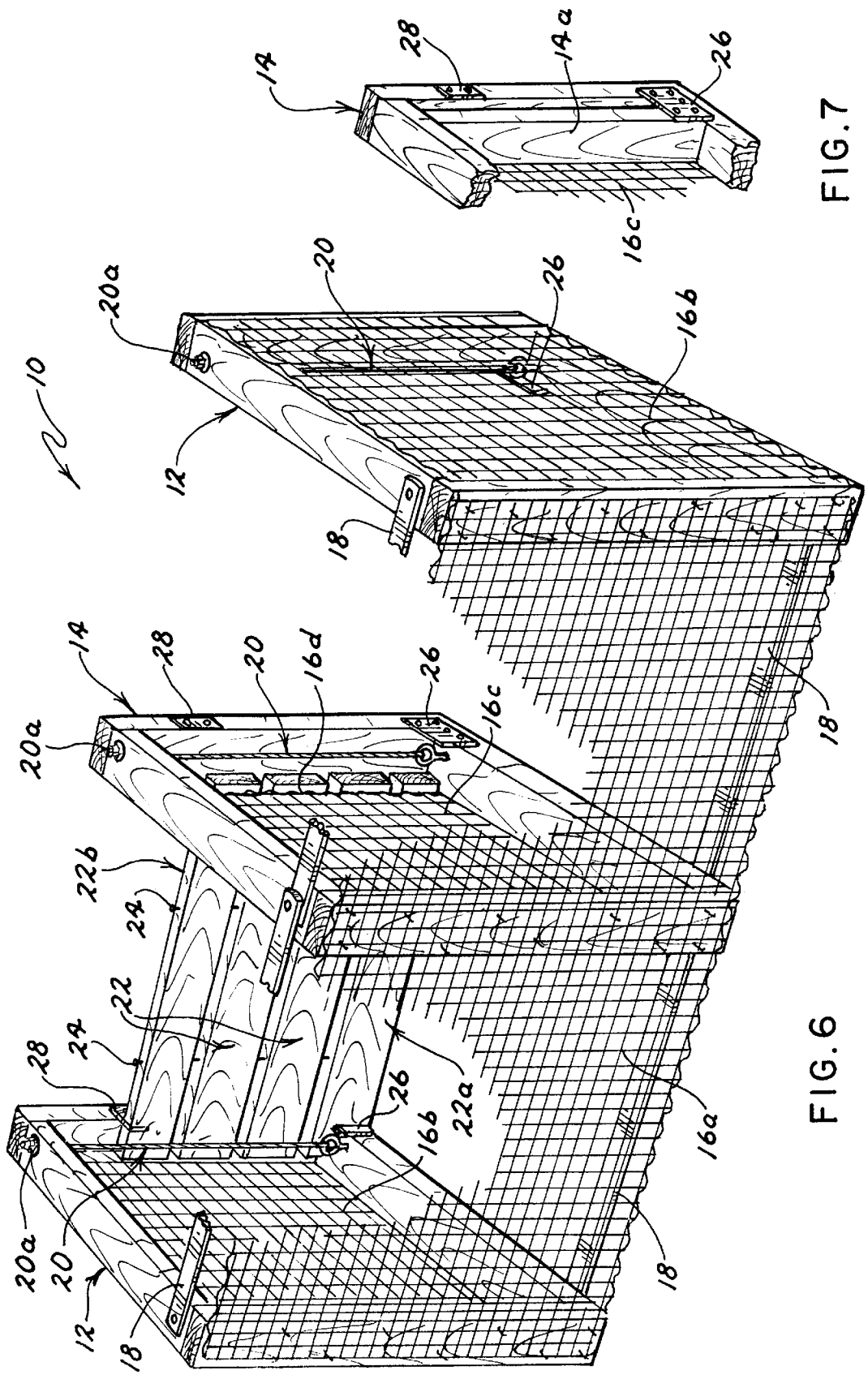
FIG. 6 is a perspective view from the back side of the fully-assembled retention unit in accord with the present invention.
FIG. 7 is a sectional view of an alternate assembly of the center frame structure shown in FIG. 6.

Referring now to FIGS. 3 and 4, outer frame structures 12 are extended away from center frame structure 14 until cross braces on the top and bottom of the retention unit 10 are perpendicular to the center frame structure 14. In this position, mesh retention material 16a is no longer restrained within the retention unit 10. The mesh retention material 16a is centered and fastened to center frame structure 14 so that equal screen lengths can be extended in opposite directions from the center frame structure 14. When outer frame structures 12 are pivoted 180 degrees, they are in allignment with center frame structure 14 for the attachment of mesh retention material 16a. Referring now also to FIGS. 5 and 6, opposite ends of the mesh retention material 16a are positioned to overlap the outer frame structure 12. In this position, mesh retention material 16a is fastened to outer frame structure 12.

The present invention provides many advantages over the prior art. Referring again to FIGS. 5 and 6, mesh retention material 16a, 16b, and 16c encloses the retention unit 10 on three sides and with center frame structure 14 defines separate enclosures for the placement of organic materials.

Multiple enclosures increase the versatility of the retention unit 10, allowing for efficient placement of organic materials according to stages of decomposition of the separate organic masses. A fourth side of the retention unit 10 is designed to maximize access to organic materials as they are rotated, "turned", or removed. Removable containment slats 22 stacked vertically between frame structures 12 and 14 and internal wire restraints 20 provide a fourth wall of containment for separate enclosures. Addition or removal of one or more containment slats 22 determine the height necessary for containment of varying amounts of organic matter within the retention unit 10. Spacers 24 are fastened to the top of containment slats 22 to allow air to flow freely between containment slats 22 to the organic materials.

Materials used to construct the retention unit 10 are utilized for structural integrity and product versatility, an advantage over prior art. Internal wire restraints 20 maintain the position of containment slats 22 inside the outer frame structures 12. However, the center frame structure 14 utilizes both internal wire restraint 20 and screen retention material 16c which is offset from center frame structure 14. This creates an opening in center frame structure 14 to accept and restrain containment slats 22. Offset screen retention material 16c is fastened to center frame structure 14 so that the unattached edge 16d of screen retention material 16c is alligned with the adjacent internal wire restraint 20. Both screen edge 16d and internal wire restraint 20 maintain the position of containment slats 22 in center frame structure 14.

Referring now also to FIG. 7, an alternate embodiment of center frame structure 14 is constructed with an additional vertical support 14a. This addition allows the previously unattached edge 16d of mesh retention material 16c to be firmly fastened to center frame structure 14. The vertical support 14a is connected to inside of center frame structure 14 so that it provides the opening necessary for maintaining internal position of containment slats 22. The vertical support 14a replaces both unattached edge 16d and the internal wire restraint 20 of center frame structure 14. This alternate embodiment increases frame support for mesh retention material 16c while decreasing the number of parts involved in the initial assembly. In conduction with vertical support 14a, metal rods may also be used to replace wire restraints of outside frame structures 12 in an alternative embodiment. Wire restraints 20 in outside frame structure 12 can be removed and metal rods inserted in their place. This further decreases the number of parts involved in assembly and eliminates the possibility of adjustments to the tension of wire restraints 20.

Referring again to FIGS. 5 and 6, containment slats 22 contribute to the accessibility and versatility of the retention unit 10 but also complete the retention unit 10 structurally. Bottom containment slats 22a interlock with outer frame structure 12 and center frame structure 14 at plates 26. Containment slats 22a are altered on both lower comers to fit flush to the ground and to form to surfaces of frame structures 12 and 14. Containment slats 22a are also slotted to engage protruding plates 26. Containment slats 22a and plates 26 interlock to make a "gravity connection" between frame structures 12 and 14, but allow for easy removal of containment slats 22a to process or remove organic materials.

Larger volumes of organic material increase outward pressure on frame structures 12 and 14. Containment slats 22b and plates 28 will also interlock to maintain upper stability and rigidity of the retention unit 10. Plates 28 can be rotated to a horizontal interlock position within slotted containment slats 22b to counteract the outward pressure of larger organic masses contained in the enclosures. They may also be returned to a vertical position on the side of frame structures 12 and 14 as containment slats 22b are removed.

While certain representative embodiments of the present invention have been described herein for the purposes of illustration, it will be apparent to those skilled in the art that modifications therein may be made without departing from the spirit and scope of the present invention.

What is claimed is:

1. A portable compost retention unit for easy assembly to retain compost or other materials when the unit is fully assembled upon a generally flat surface, the compost retention unit comprising:

(a) mesh retention through which air and small particles my pass;

(b) a plurality of interconnected frame structures for providing support for the mesh retention material; the mesh retention material being secured to the plurality of frame structures such that the frame structures and mesh retention material can cooperate to retain compost or other materials when the unit is fully assembled upon the generally flat surface; wherein the plurality of frame structures include at least three rectangular frame structures, each frame structure defining an opening, each opening covered by mesh retention material, the three rectangular frame structures including a middle structure pivotally interconnected with each of two lateral frame structures such that the middle frame structure may pivot 180 degrees with respect to each of the lateral frame structures when the compost retention unit is assembled.

2. The portable compost retention unit of claim 1 wherein the interconnected frame structures are rectangular structures made from a plurality of interconnected lengths of wooden framing materials.

3. The portable compost retention unit of claim 2 wherein the plurality of interconnected lengths of wooden framing materials include four lengths of wooden two-by-four framing materials.

4. The portable compost retention unit of claim 2 wherein the lengths of wooden framing material are secured together to form the rectangular frame structure and the mesh material is secured to each of the frame structures to prevent the passage of large objects having a size greater than any opening in the mesh retention material, the mesh retention material covering openings defined by the lengths of framing material in each frame structure.

5. The portable compost retention unit of claim 1 wherein the mesh retention material is a wire mesh material.

* * * * *